(12) United States Patent
Prabhakar et al.

(10) Patent No.: US 11,405,248 B2
(45) Date of Patent: Aug. 2, 2022

(54) FPGA BASED SYSTEM FOR DECODING PAM-3 SIGNALS

(71) Applicant: PRODIGY TECHNOVATIONS PVT. LTD., Bengaluru (IN)

(72) Inventors: Prajeesh Prabhakar, Bengaluru (IN); Sudarshan Shenoy Mulki, Bengaluru (IN); Zakioddin Mahammad, Bengaluru (IN)

(73) Assignee: PRODIGY TECHNOVATIONS PVT. LTD., Bengaluru (IN)

( * ) Notice: Subject to any disclaimer, the term of this patent is extended or adjusted under 35 U.S.C. 154(b) by 0 days.

(21) Appl. No.: 17/180,389

(22) Filed: Feb. 19, 2021

(65) Prior Publication Data

US 2022/0045887 A1   Feb. 10, 2022

(30) Foreign Application Priority Data

Feb. 21, 2020   (IN) .............................. 202041007468

(51) Int. Cl.
*H04L 27/06* (2006.01)
*H04L 7/00* (2006.01)

(52) U.S. Cl.
CPC .............. *H04L 27/06* (2013.01); *H04L 7/0016* (2013.01)

(58) Field of Classification Search
CPC ......... H04L 27/06; H04L 27/20; H04L 27/12; H03F 2200/339
See application file for complete search history.

(56) References Cited

U.S. PATENT DOCUMENTS

| | | | |
|---|---|---|---|
| 8,199,859 B2* | 6/2012 | Zerbe | H04L 25/03006 375/353 |
| 11,121,892 B2* | 9/2021 | Pinto | H04L 25/0268 |
| 2009/0060061 A1* | 3/2009 | Konishi | H04L 5/006 375/295 |
| 2014/0112382 A1* | 4/2014 | Bliss | H04B 7/0456 375/233 |
| 2016/0380698 A1* | 12/2016 | Elahmadi | G02B 6/00 398/135 |
| 2019/0110084 A1* | 4/2019 | Jia | H03M 1/008 |
| 2019/0131999 A1* | 5/2019 | Hühn | H03F 3/38 |
| 2022/0045887 A1* | 2/2022 | Prabhakar | H04L 7/0016 |

* cited by examiner

*Primary Examiner* — Qutbuddin Ghulamali
(74) *Attorney, Agent, or Firm* — Maschoff Brennan

(57) ABSTRACT

An FPGA based system for decoding PAM-3 signals is disclosed, wherein the system comprises a directional coupler for separating 100BASE-T1 and 1000BASE-T1 master and slave signals, DVGAs for amplifying the master and slave signals, ADCs for sampling the amplified signals, and a FPGA module, wherein the FPGA module is configured for decoding the PAM-3 symbols, in real-time, from oversampled ADCs data using fully pipelined Register Transfer Level (RTL) architecture.

19 Claims, 12 Drawing Sheets

FPGA BASED SYSTEM FOR DECODING PAM-3 SIGNALS

TECHNICAL FIELD

The present invention relates to the field of data communication and more particularly relates to a FPGA based system for decoding multi-level PAM-3 signals.

BACKGROUND

Over the last decade, the automotive industry has evolved rapidly. Modern automobiles use a plurality of Electronic Control Units (ECUs) that monitor and control the various electronic components in the automobile. Typically, automobiles are loaded with various sensor-based comfort and safety features and sophisticated applications to improve users' safety, fuel consumption and convenience. Typically, such features and applications rely on high bandwidth. The increasing use of ECUs in automobiles and advanced signal processing is driving the need for high performance automotive communication networks. As a result, Ethernet standard has emerged as the standard for automotive communications over other low speed protocols such as Local Interconnect Network (LIN) protocol, Controller Area Network (CAN) protocol, FlexRay protocol, etc. Two variants of Ethernet protocol—100BASE-T1 and 1000BASE-T1 are currently being adopted in automotive communication networks. The 100BASE-T1 and 1000BASE-T1 are developed to support 100 Mbps and 1 Gbps respectively and aimed at increasing data throughput, meeting strong automotive emission standards, and reducing cabling weight and cost in automotive networking.

Particularly, the 100BASE-T1 variant uses full duplex connection between two ECUs using differential pair of wires for data transmission and uses PAM-3 signalling at the Physical Layer (PHY). Due to this, signals from a master ECU and a slave ECU propagating in opposite directions overlay in the cable, resulting in a multi-level signal on the cable. The master and slave ECUs can decode the data as both ECUs know the contribution of their own signal and are able to reconstruct the incoming signal out of the sum. However, the full duplex transmission makes it difficult to probe the 100BASE-T1 line to decode the signal for test and analysis, and this is a major challenge faced in designing test and measurement equipment such as, protocol analyzers. There are devices such as directional couplers which can separate the overlaid signals between the ECUs and give them out on separate channels. However, the outputs of such devices are noisy and extensive signal processing might be needed to reconstruct and decode the original PAM-3 signals.

SUMMARY

This summary is provided to introduce a selection of concepts in a simplified format that are further described in the detailed description of the invention. This summary is not intended to identify key or essential inventive concepts of the subject matter, nor is it intended for determining the scope of the invention.

Thus, with reference to the state of the art, there has been long felt need for a system and a method for tapping the signal on the line and sense signal in both directions. It is an aim of the present disclosure to disclose a system that is capable for decoding PAM-3 signals between two devices employing 100BASE-T1 Ethernet standard.

The system for decoding PAM-3 signals communicating between a master device and a slave device comprises, a directional coupler, connected to a line between the master device and the slave device, for separating the master and the slave signals, a pair of DVGAs configured for amplifying the master and slave signals to a specific voltage range, a pair of ADCs configured for converting analog master and slave signals to digital master and slave signals, a FPGA module configured for processing both the digital master and slave signals for extracting PAM-3 symbols. The FPGA module comprises, ADC interface modules configured for sampling and de-serializing digital master and slave signals, DC correction modules configured for employing DC correction to compensate for variations in the signal levels of the de-serialized digital master and slave signals, slope and level detection modules configured for decoding PAM-3 levels, spike filter modules configured for filtering out spikes in the PAM-3 levels to generate initial PAM-3 levels, edge detection modules configured for detecting and storing transitions in the filtered PAM-3 levels, a mid-point detection module configured for detecting mid-point of each 'must transition', first level edge filters and second level edge filters configured for filtering out erroneous transitions in the levels, sampling point detection modules configured for calculating sampling point of filtered PAM-3 levels, sampling point filtering modules configured for eliminating erroneous sampling points, if any, and PAM-3 symbol generation module configured for generating PAM-3 symbols from the initial PAM-3 levels using the sampling point.

Further, a method for decoding PAM-3 signals communicating between a master device and a slave device is disclosed. The method comprises, separating the master and the slave signals communicating between the master device and the slave device, amplifying the master and slave signals to a specific voltage range, converting analog master and slave signals to digital master and slave signals, and processing both the digital master and slave signals for extracting PAM-3 symbols, wherein processing comprises, sampling and de-serializing digital master and slave signals, employing DC correction to compensate for variations in the signal levels of the de-serialized digital master and slave signals, detecting PAM-3 levels from the de-serialized digital master and slave signals, filtering out spikes in the PAM-3 levels to generate initial PAM-3 levels, generating PAM-3 symbols from the initial PAM-3 levels using a sampling point. The sampling point calculation comprises the steps of, detecting all transitions and 'must transitions' and registering such transitions of the filtered PAM-3 levels, detecting mid-point of each 'must transition', first and second level filtering to filter out erroneous transitions in the levels, and calculating sampling point of each registered transitions.

To further clarify advantages and features of the present disclosure, a more particular description of the invention will be rendered by reference to specific embodiments thereof, which is illustrated in the appended figures. It is to be appreciated that these figures depict only typical embodiments of the invention and are therefore not to be considered limiting of its scope. The invention will be described and explained with additional specificity and detail with the accompanying figures.

BRIEF DESCRIPTION OF THE FIGURES

Such a system and method are disclosed herein and will be described and explained with additional specificity and detail with the accompanying figures in which:

FIG. 411 illustrates sampling point taken every $12^{th}$ sample;

Figure 1:
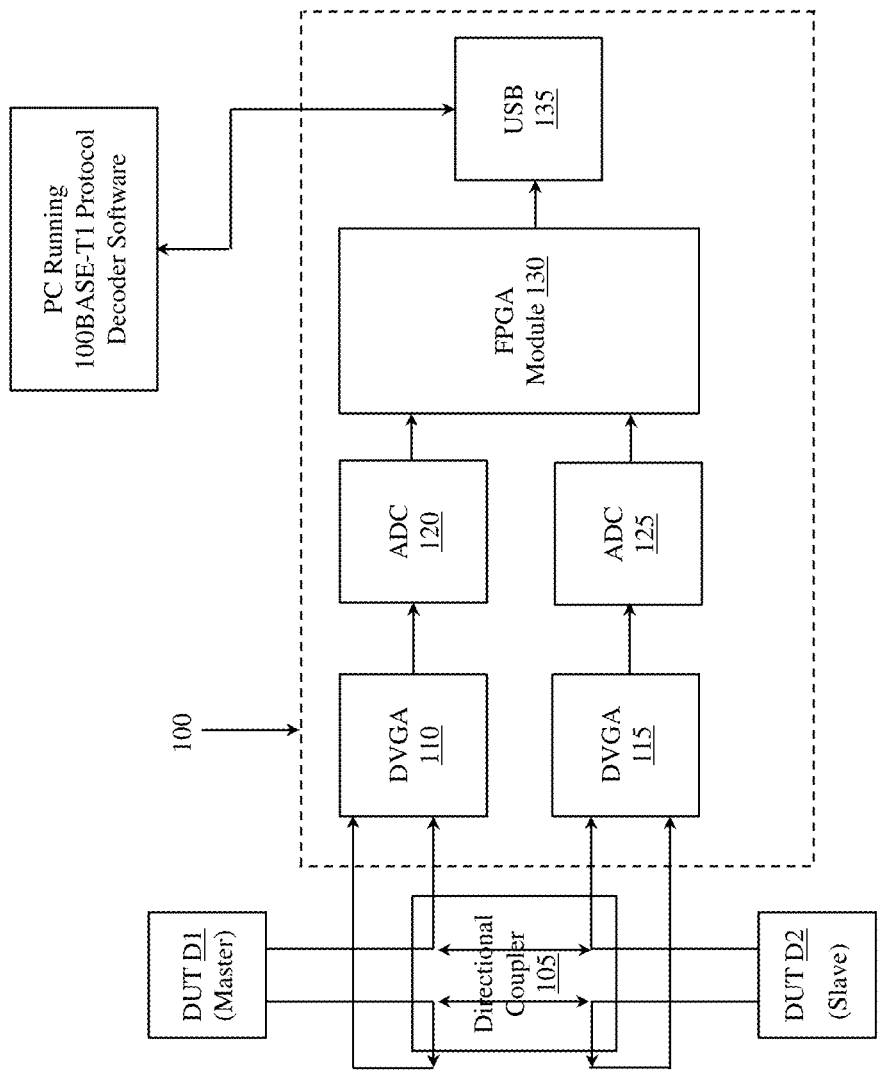
FIG. 1 illustrates a FPGA based system for decoding 100BASE-T1 PAM-3 signals in accordance with an embodiment of the present disclosure.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION OF THE EXEMPLARY EMBODIMENTS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

Embodiments of the present disclosure disclose a Field Programmable Gate Array (FPGA) based system for decoding three level Pulse Amplitude Modulated Signals (PAM-3 signals), particularly for decoding 100BASE-T1 PAM-3 signals using a directional coupler and an Analog to Digital Converter (ADC). In other words, the present disclosure discloses a FPGA based system for acquiring and decoding master and slave PAM-3 signals in real-time from a directional coupler. The proposed FPGA based system uses master and a slave PAM-3 signal separated using a directional coupler as an input, decodes the PAM-3 signals, and provides decoded PAM-3 signals to a 100BASE-T1 protocol decoder for higher layer Ethernet protocol decoding.

FIG. 1 illustrates a FPGA based system for decoding 100BASE-T1 PAM-3 signals in accordance with an embodiment of the present disclosure. The FPGA based system 100 may be implemented to probe the 100BASE-T1 line between the two devices D1 and D2 under test and for decoding the PAM-3 signals between them. The devices under test (D1 and D2) may refer to Electronic Control Units (ECUs) of an automobile, which may be master and slave ECUs of the automobile. Hereinafter, D1 is referred to as "master device D1" and D2 is referred to as "slave device D2". As shown, in one embodiment of the present disclosure, the FPGA based system 100 comprises a directional coupler 105, two Digital Variable Gain Amplifiers (DVGAs) 110 and 115, two Analog to Digital Converters (ADCs) 120 and 125, a Field Programmable Gate Array (FPGA) module 130 and a Universal Serial Bus (USB) Controller 135.

The directional coupler 105 is connected to the line (differential pair of wires) between the master device D1 and slave device D2 and the directional coupler 105 is configured for separating the master and slave signals, that is, the signals transmitted by the master device D1 and the slave device D2. The output of the directional coupler 105, that is, the master signals and the slave signals are fed to the two DVGAs 110 and 115 respectively as shown in FIG. 1. It is to be noted that the two directional couplers may be used for separating the master and slave signals.

The DVGAs 110 and 115 are digitally controlled variable gain amplifiers that vary their gains depending on the register value programmed by the FPGA module 130. In one embodiment of the present disclosure, the DVGAs 110 and 115 are configured for amplifying the input signals to the specified input voltage range of the ADCs 120 and 125. That is, since the outputs of the directional coupler 105 are low in amplitude, the DVGAs 110 and 115 are used in the front end to amplify the signals to the specified input voltage range of ADCs 120 and 125. Referring to FIG. 1, DVGA 110 amplifies the master signals from the directional coupler 105 and the DVGA 115 amplifies the slave signals from the directional coupler 105. The amplified master and slave signals are then fed to ADCs 120 and 125 for further processing.

The ADCs 120 and 125 convert the analog input signals into digital signals. In one embodiment of the present disclosure, the sampling rate of ADCs 120 and 125 is fixed at 800 Msps (mega samples per second) which is approximately 12 times the data rate of 100BASE-T1 PAM-3 signal, which is 66.66 Mbps. This sampling rate is selected for allowing enough samples per PAM-3 symbol time to decode the symbols correctly. Even though sampling rate of each ADC (120 and 125) is twelve times the ideal data rate of 100BASE-T1 signal, the ADC's sampling is treated as asynchronous with respect to the 100BASE-T1 data rate (since each uses separate reference clocks) and appropriate steps are followed in further modules to lock PAM-3 level sampling rate to the line data rate. Referring to FIG. 1, ADC 120 and ADC 125 sample master signals and slave signals respectively. In one implementation, each ADC 120 and 125 uses Low Voltage Differential Signalling (LVDS) interface for sending sampled data to the FPGA module 130.

As described, the master and the slave signals are derived from the differential pair of wires between the master device D1 and the slave device D2 using the directional coupler 105, the derived signals are amplified using the two DVGAs 110 and 115, and the amplified signals are sampled at 800 Msps using the ADCs 120 and 125. Then the output of ADCs 120 and 125, that is, the twelve times oversampled data is fed to the FPGA module 130 for extracting the PAM-3 symbols and sending the extracted PAM-3 symbols to a computer having the appropriate software for higher layer protocol decoding. The manner in which the PAM-3 symbols are decoded from the oversampled ADCs 120 and 125 data using a fully pipelined Register Transfer Level (RTL) logic in FPGA module 130 is described in detail further below.

Figure 2:
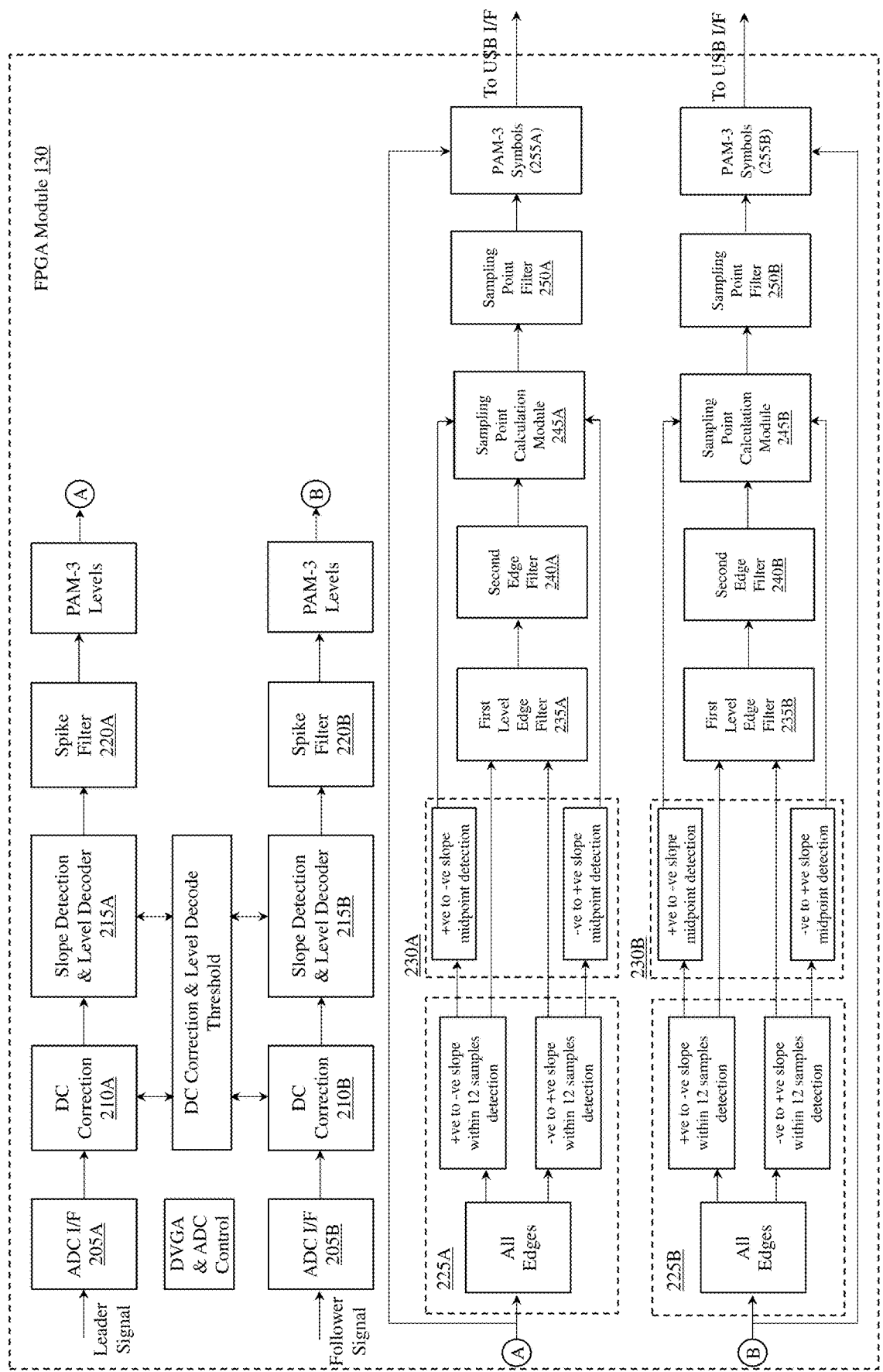
FIG. 2 illustrates FPGA dataflow for decoding PAM-3 symbols in accordance with an embodiment of the present disclosure.

FIG. 2 illustrates FPGA data flow for decoding PAM-3 symbols in accordance with an embodiment of the present disclosure. In one implementation, the data from the two ADCs 120 and 125 (output of ADCs) are processed in parallel (as shown in two parallel processing paths) for enabling real time decoding of the PAM-3 symbols. As the master and slave data are processed in parallel, both are considered as input data to the FPGA module 130 and the manner in which they are processed is described in further detail below.

Figure 3:
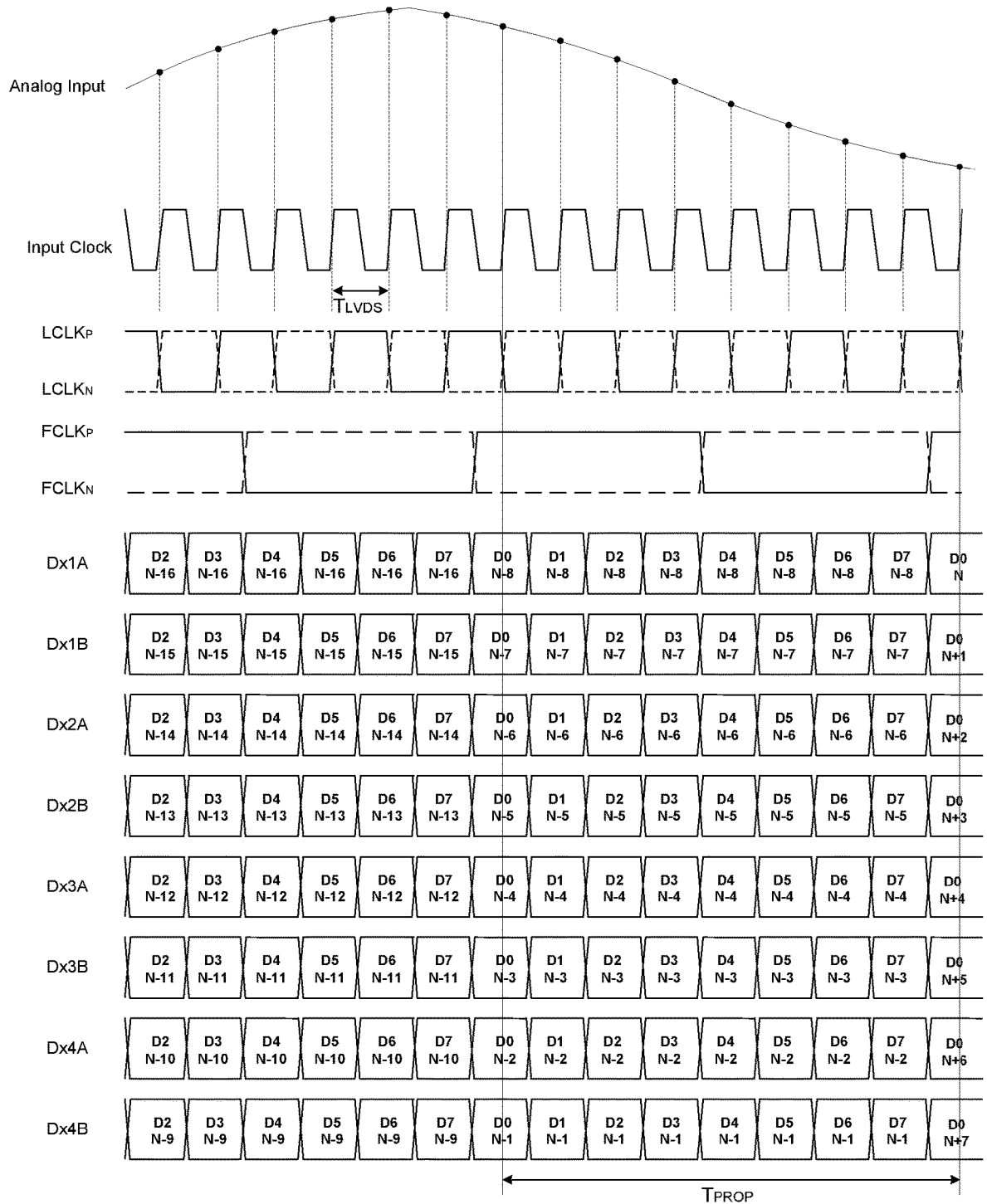
FIG. 3 illustrates an exemplary ADC interface timing diagram in accordance with an embodiment of the present disclosure.

Initially, in one embodiment of the present disclosure, ADC interface modules 205A and 205B sample the input LVDS ADC data. The sampled data is further de-serialized using ISERDES modules inside the FPGA module 130 and stored in an internal buffer for further processing. FIG. 3 illustrates an exemplary ADC interface timing diagram in accordance with an embodiment of the present disclosure.

Figure 4A:
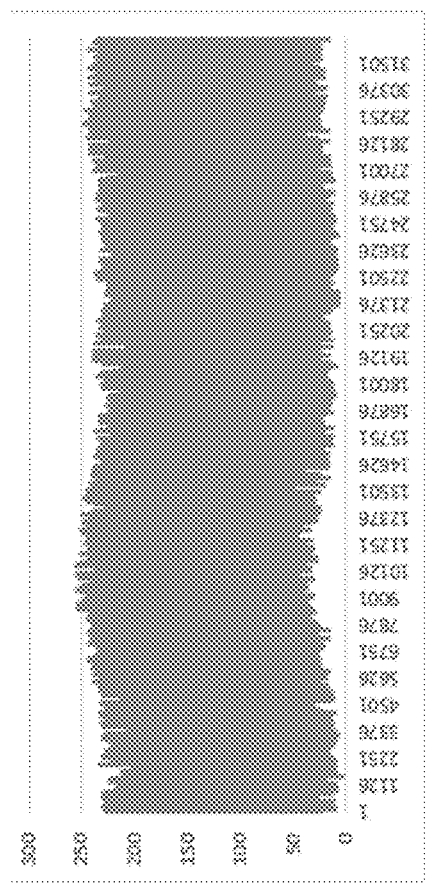
FIG. 4A illustrates ADCs samples before DC correction.
Figure 4B:
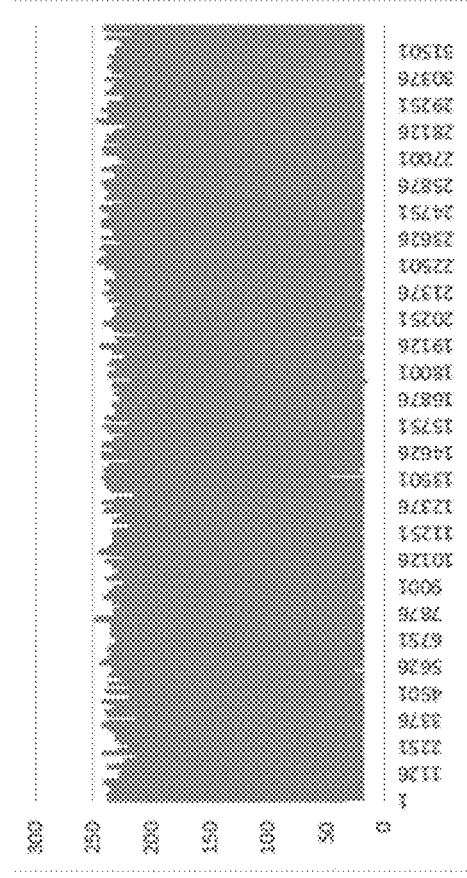
FIG. 4B illustrates DC corrected ADCs samples in accordance with an embodiment of the present disclosure.

As the output of the directional coupler 105 is noisy, the ADCs 120 and 125 output are also noisy, and direct decoding of the outputs of the ADCs may lead to erroneous outputs. Hence, in one embodiment of the present disclosure, DC correction is employed, through DC correction module 210A and 210B, on the ADCs output data to compensate for the variations in the signal level. In one implementation, a time domain averaging based approach is used, as the noise is random, and any filtering of the PAM-3 signal may make it further difficult to decode PAM-3 symbols. The block length used for DC Correction is 128, which means that present ADC sample and previous 127 ADC samples are considered for deciding the present DC corrected ADC sample. The block length can be varied based on the nature of ADC samples. FIG. 4A illustrates ADC samples before DC correction. FIG. 4B illustrates DC corrected ADC samples in accordance with an embodiment of the present disclosure. In a preferred embodiment, the upper and lower thresholds for DC correction are made programmable for enabling fine tuning during testing with different ECUs and test environments. Option to disable DC Correction is also provided to use when the directional coupler 105 output is not very noisy (DC level does not vary much).

The formula for DC correction is as given below:

If (MAX>Plus_Threshold &&
   MIN<Minus_Maximum_Threshold && (Actual_ADC_data−MIN+Minus_Threshold<255))

DC corrected value=Actual_ADC_data−MIN+Minus_Threshold

Else

Figure 4C:
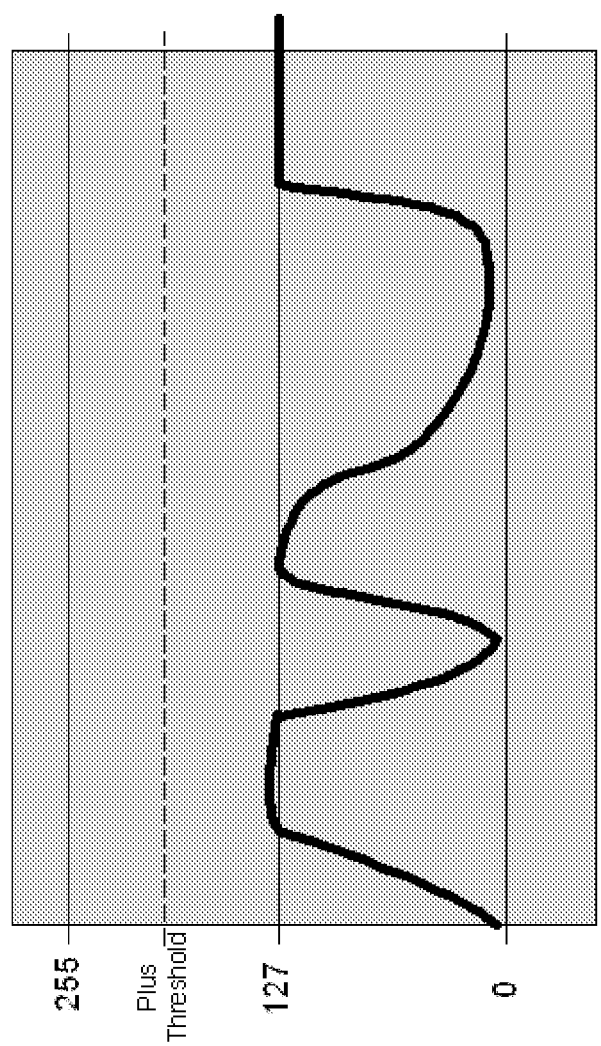
FIG. 4C illustrates the case where DC Correction should not be done if data is continuously −1 and 0 without +1.
Figure 4D:
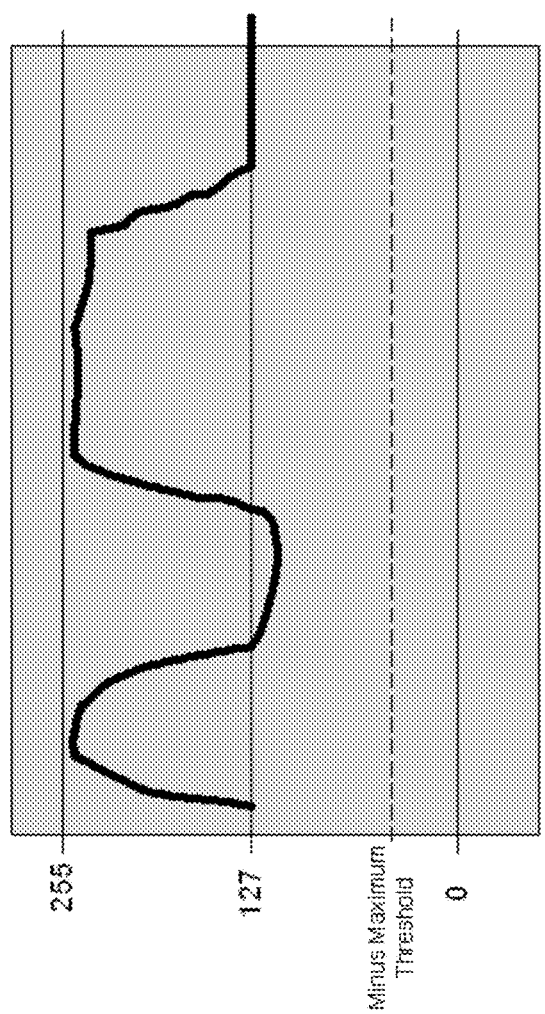
FIG. 4D illustrates the case where DC Correction should not be done if data is continuously +1 and 0 without −1.

DC corrected value=Actual_ADC_data

Where MAX and MIN are maximum and minimum values of ADC samples in one block of ADC samples MAX>Plus_Threshold is used because DC Correction should not be done if data is continuously −1 and 0. MAX value will be low in this case and hence correction is not done. FIG. 4C illustrates this scenario (continuous −1 and 0 without +1). MIN<Minus_Maximum_Threshold is used because DC Correction should not be done if data is continuously +1 and 0. MIN value will be high in this case and hence correction is not done. FIG. 4D illustrates this scenario (continuous +1 and 0 without −1).

(Actual_ADC_data—MIN+Minus_Threshold<255) is used to take care of the condition where DC Corrected data is going above 255.

The DC corrected data is fed to Slope Detection and Level Decode modules 215A and 215B. In one embodiment of the present disclosure, the slope detection and level decode modules 215A and 215B are configured for decoding the PAM-3 levels based on four thresholds. That is, from the DC corrected data, the slope detection and level decode modules 215A and 215B decodes the PAM-3 levels based on four thresholds, wherein the first threshold is for 0 to +1 or −1 to +1, the second threshold is for 0 to −1 or +1 to ~1, the third threshold is for +1 to 0 and the fourth threshold is for −1 to 0. The threshold values can be predetermined and programmed.

Exemplary default values of the thresholds are as follows.
Plus Threshold=140
Minus Threshold=95
Zero Plus Threshold=160
Zero Minus Threshold=80

Figure 4E:
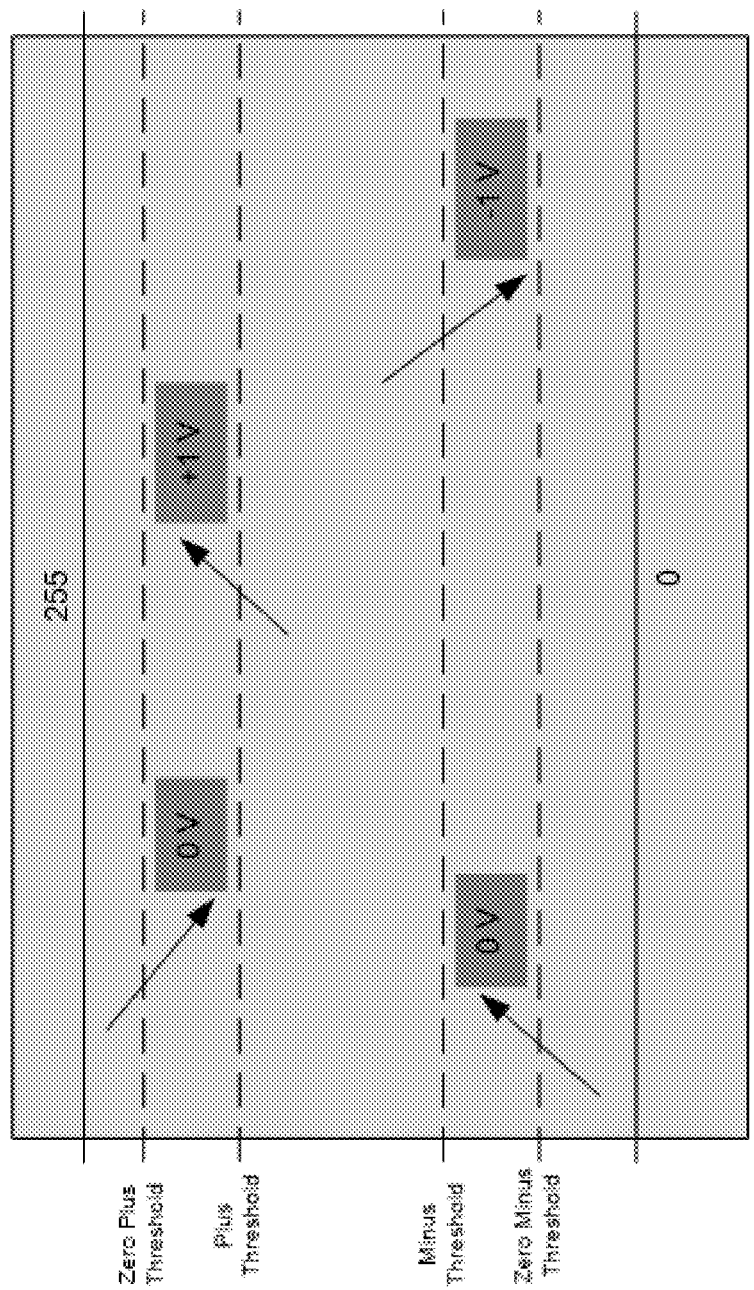
FIG. 4E illustrates the thresholds used for PAM-3 level decoding.

FIG. 4E illustrates the thresholds used. If present ADC sample is greater than previous ADC sample, it means the present sample may be going towards+1 or 0. To decode this, two thresholds are used; Plus threshold and Zero Minus threshold. If present ADC sample is greater than Plus threshold, then the sample is +1. If present ADC sample is lesser than Plus threshold but greater than Zero Minus threshold, then the sample is 0. If not, the sample value is same as the previous PAM3 level value. If present and previous ADC samples are equal, then also the sample value is same as the previous PAM3 level value. If present ADC sample is smaller than previous ADC sample, it means the present sample may be going towards −1 or 0. To decode this, remaining 2 thresholds are used; Minus Threshold and Zero Plus threshold and the decoding logic is similar to that of positive slope.

Optional Dynamic Threshold feature is also supported if the directional coupler 105 output is too noisy and Fixed Threshold is resulting in erroneous decoding of PAM-3 levels. When Dynamic Threshold feature is enabled, all 4 thresholds are updated dynamically based on the difference in values of ADC samples corresponding to +1/0/−1 levels between each block. Block length is programmable, and the default block length is 12 samples corresponding to one PAM-3 symbol interval.

Figure 4F:
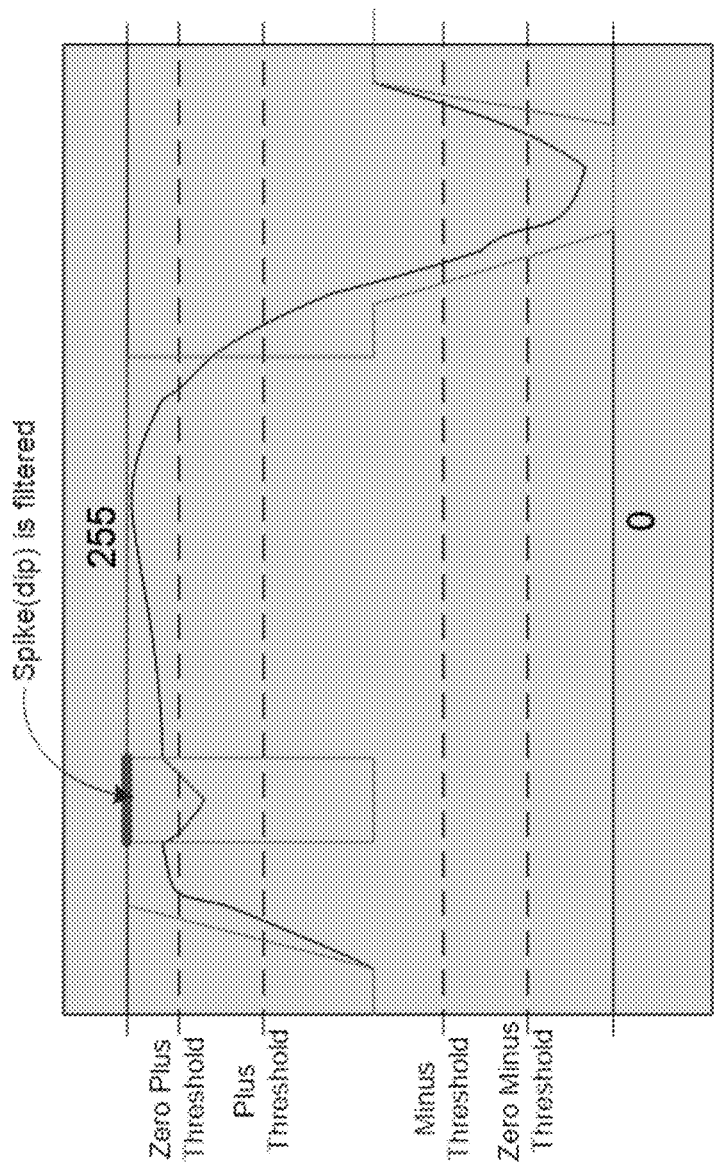
FIG. 4F illustrates spike filter logic.

As the directional coupler 105 output is noisy, the decoded levels may have wrong transitions, and hence, the decoded signals are fed to the Spike Filter modules 220A and 220B for filtering out spikes in the decoded signals. FIG. 4F illustrates spike filter logic. The outputs of the spike filter modules 220A and 220B, that is, the filtered decoded signals, are the initial PAM-3 levels from where the PAM-3 symbol needs to be decoded by making sure that the sampling point is as per 100BASE-T1 data rate. The method for deriving correct sampling point of PAM-3 levels is described in further detail below.

Initially, in one embodiment of the present disclosure, edge information of the filtered PAM-3 levels is registered using edge detection modules 225A and 225B. In one implementation, if there exists positive to negative (+ve to −ve) or negative to positive (−ve to +ve) transition within twelve samples (corresponding to one PAM-3 symbol), those are considered as transitions that should not be missed, and this information is registered. For ease of understanding, such transitions are referred to as "must transitions" in the present disclosure.

Upon identifying and registering the "must transitions", midpoints of the "must transitions" are calculated, using midpoint detection modules 230A and 230B, which are "must sampling points" that should not be missed. "must sampling points" are used to resynchronize the sampling points to PAM-3 symbol timing on 100BASE-T1 bus as ADC sampling of PAM-3 signal is asynchronous sampling procedure (since ADC uses separate reference clock). It is to be noted that a zero value for a midpoint indicates an invalid midpoint (corresponding to no valid 'must transitions').

Upon identifying the "must transitions", first level edge filters 235A and 235B retain all the edges corresponding to the "must transitions". Further, edges where distance from previous edge is greater than or equal to nine samples are also retained. All other edges, which corresponds to erroneous transitions in levels due to non-ideal PAM-3 signals, are filtered out. The output of the first level edge filters 235A and 235B are fed to a second level edge filters 240A and 240B for further filtering.

In one embodiment of the present disclosure, the second level edge filters 240A and 240B are configured for discarding an edge from the corresponding first level edge filters 235A and 235B, if there is an edge corresponding to a "must transition" (as explained above) within the next four samples. For example, two such consecutive edges may appear at the first level edge filters 235A and 235B output if the first edge meets the minimum distance requirement of nine samples and second edge meets "must transition" requirement. In such a case, the second level edge filters 240A and 240B discard the first edge.

Upon identifying the "must transitions" by discarding the edges corresponding to the erroneous transitions in the levels due to non-ideal PAM-3 signals, sampling points are calculated using sampling point calculation modules 245A and 245B, as shown in FIG. 2. In one embodiment of the present disclosure, the sampling point calculation modules 245A and 245B calculates the sampling point based on the following scenarios.

Figure 4G:
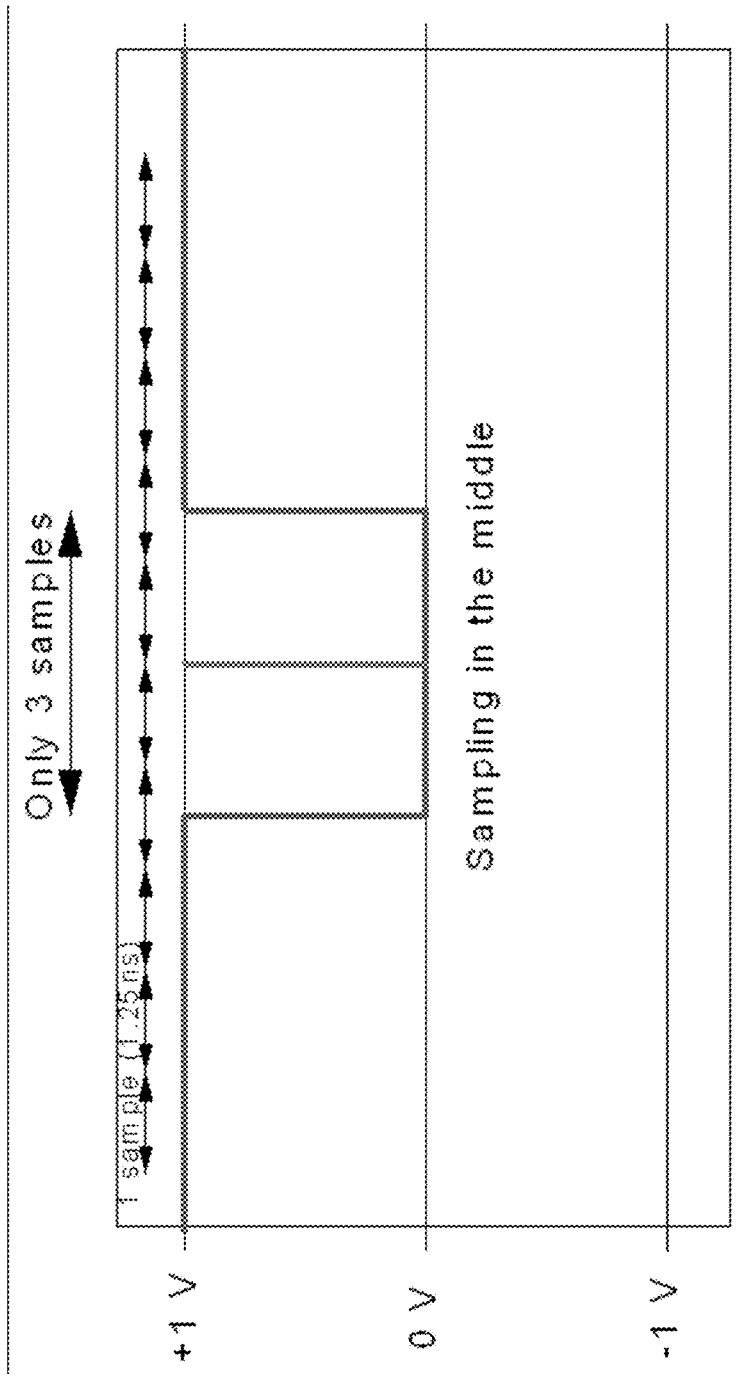
FIG. 4G illustrates sampling of "must transition" point.

For any Second Level Filtered edge, if there is a non-zero midpoint value corresponding to a "must transition",
the midpoint value is taken as the valid sampling point. This ensure that the PAM-3 Level signals are sampled at the centre in such cases and does not miss even narrow edges. This is illustrated in FIG. 4G.

For any second level filtered edge, if there is no non-zero midpoint value corresponding to a "must transition", sampling point is taken as $12^{th}$ sample from previous sampling point. This covers the scenario where three are +1/0/−1 levels which are wider than the width of one PAM-3 symbol.

Figure 4H:
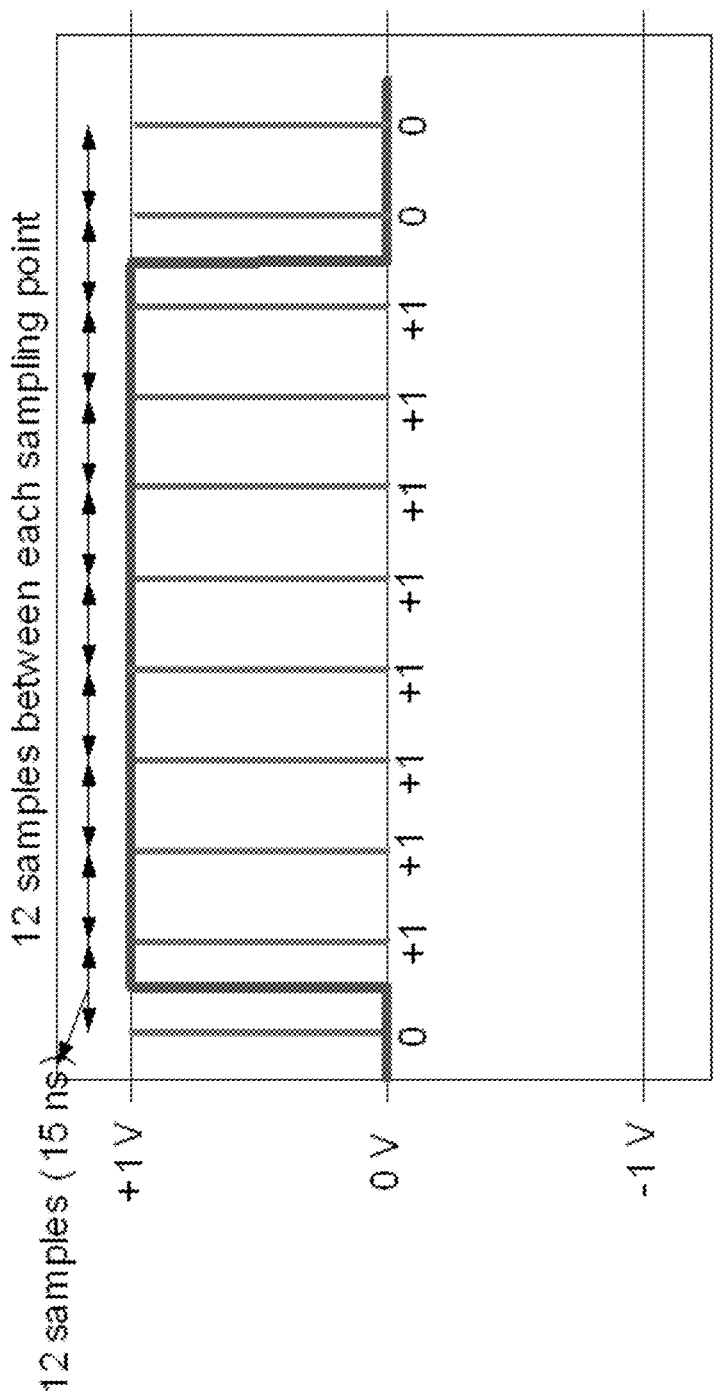
FIG. 4I illustrates discarding of wrong sampling point.

If there is no second level filtered edge, sampling point is taken every $12^{th}$ sample; this covers the scenario where there are consecutive same data (+1/0/−1). This is illustrated in FIG. 4H.

It is to be noted that erroneous sampling point may occur if there are same symbols consecutively for a long time. Hence, in one embodiment of the present disclosure, upon calculating the sampling point, sampling point filters 250A and 250B are used for eliminating erroneous sampling points, if any. One or more filtering methods implemented by the sampling point filters 250A and 250B are as follows:

For any Sampling Point, if it corresponds to a "must transition", that is considered a valid sampling point and retained.

Figure 4I:
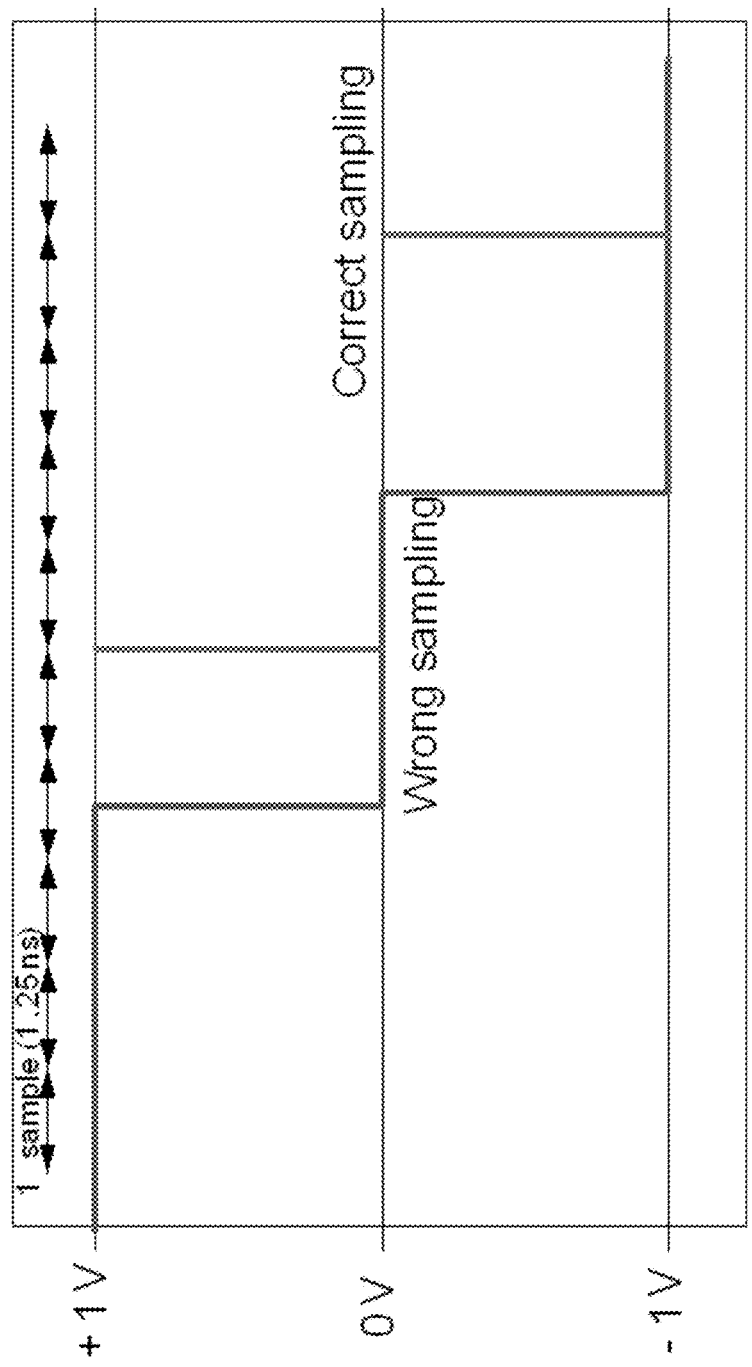

For any Sampling Point, if it does not correspond to a "must transition" and if there is a sampling point within next four samples, that sampling point is discarded. Second sampling point will be a valid sampling point in this case. This is illustrated in FIG. 4I.

All other Sampling Points are retained.

Upon deriving the sampling point, PAM-3 symbol generation module (255A and 255B) generates PAM-3 symbols from the initial PAM-3 levels using the sampling point. The generated PAM-3 symbols are fed to the computer having the appropriate software, using USB interfaces, for higher layer protocol decoding, and further analysis.

Figure 5:
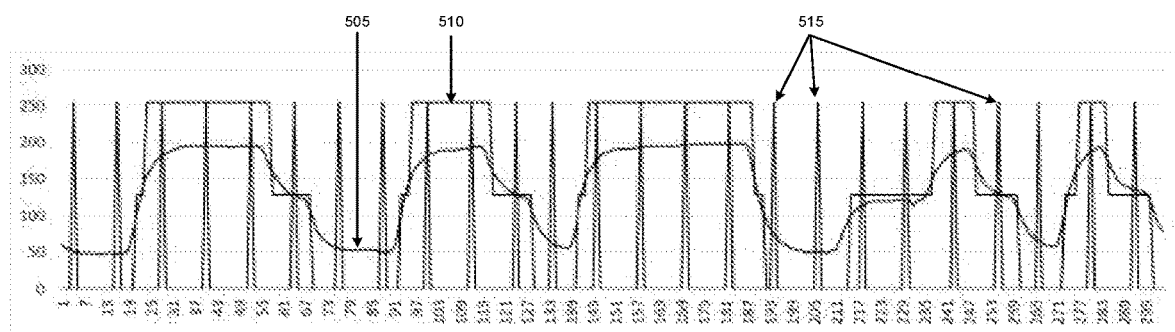
FIG. 5 illustrates portion of an exemplary 100BASE-T1 signal captured using FPGA based system 100 in accordance with an embodiment of the present disclosure.

FIG. 5 illustrates a portion of an exemplary 100BASE-T1 signal captured using FPGA based system 100 in accordance with an embodiment of the present disclosure. Referring to FIG. 5, 505 represents ADC Samples, 510 represents PAM-3 Level Signals, and 515 represents filtered sampling points.

The system disclosed in the present disclosure, employs a real time hardware based (FPGA based system) decoding of PAM-3 signals and uses fully pipelined Register Transfer Level (RTL) architecture to implement the decoding logic. This enables real-time or near-real-time streaming of the decoded PAM-3 symbols to the computer having the appropriate software for further higher level automotive Ethernet protocol decoding and analysis.

Even though the functions of the system are disclosed considering the example of 100BASTE-T1, 100 Mbps variant of automotive Ethernet standard, a person skilled in the art will realise that the system may be implemented for decoding 1000BASE-T1 PAM-3 signals by increasing the ADC sampling rate and making corresponding modifications in the FPGA module logic.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the method described herein. Moreover, the actions of any flow diagram need not be implemented in the order shown; nor do all the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

We claim:

1. A system for decoding Pulse Amplitude Modulated Signals (PAM-3 signals) communicating between a master device (D1) and a slave device (D2), the system comprising:
   a directional coupler, connected to a line between the master device (D1) and the slave device (D2), for separating analog master and slave signals;
   a pair of Digital Variable Gain Amplifiers (DVGAs) configured for amplifying the analog master and slave signals to a specific voltage range;
   a pair of Analog to Digital Converters (ADCs) configured for converting the analog master and slave signals to digital master and slave signals;
   a Field Programmable Gate Array (FPGA) module configured for processing both the digital master and slave signals for extracting PAM-3 symbols, wherein the FPGA module (130) comprises:
   Analog to Digital Converter (ADC) interface modules configured for sampling and de-serializing the digital master and slave signals;
   DC correction modules configured for employing DC correction to compensate for variations in signal levels of the de-serialized digital master and slave signals;
   slope and level detection modules configured for decoding PAM-3 levels;
   spike filter modules configured for filtering out spikes in the PAM-3 levels to generate initial PAM-3 levels;
   edge detection modules configured for detecting and storing transitions in the filtered PAM-3 levels, and detecting 'must transitions' which corresponds to positive to negative (+ve to −ve) or negative to positive (−ve to +ve) transitions within twelve samples;
   a mid-point detection module configured for detecting mid-point of each of the 'must transitions';
   first level edge filters and second level edge filters configured for filtering out erroneous transitions in the PAM-3 levels;
   sampling point detection modules configured for calculating sampling point of the filtered PAM-3 levels;
   sampling point filtering modules configured for eliminating erroneous sampling points, if any; and
   PAM-3 symbol generation module configured for generating PAM-3 symbols from the initial PAM-3 levels using the sampling point.

2. The system as claimed in claim 1, wherein the pair of DVGAs amplifies the analog master and slave signals to the specific voltage range of the pair of ADC.

3. The system as claimed in claim 1, wherein a sampling rate of the pair of ADCs is 800 mega samples per second which is approximately twelve times the data rate of 100BASE-T1 PAM-3 signal, which is 66.66 Mbps.

4. The system as claimed in claim 1, wherein upper and lower thresholds for DC correction is programmable for enabling fine tuning during testing with different devices and test environments.

5. The system as claimed in claim 1, wherein the DC correction modules is operable to disable DC Correction feature when the directional coupler output is not noisy.

6. The system as claimed in claim 1, wherein the slope and level detection modules decodes the PAM-3 levels based on four thresholds, wherein a first threshold is for 0 to +1 or −1 to +1, a second threshold is for 0 to −1 or +1 to −1, a third threshold is for +1 to 0 and a fourth threshold is for −1 to 0.

7. The system as claimed in claim 1, wherein the slope and level detection modules are programmable to dynamically vary PAM-3 level decoding thresholds if the directional coupler output is noisy and fixed threshold is resulting in erroneous decoding of the PAM-3 levels.

8. The system as claimed in claim 1, wherein the midpoint detection module detects and stores mid-points of the 'must transitions' that are 'must sampling points', the must sampling points that should not be missed.

9. The system as claimed in claim 8, the 'must sampling points' are used to resynchronise the sampling points to PAM-3 symbol timing on 100BASE-T1 bus as ADC sampling of PAM-3 signal is asynchronous sampling procedure.

10. The system as claimed in claim 1, wherein the first level edge filters are configured for:
    retaining all the edges corresponding to the must transitions;
    retaining the edges where distance from previous edge is greater than or equal to nine samples; and
    deleting other edges which corresponds to erroneous transitions in levels due to non-ideal PAM-3 signals.

11. The system as claimed in claim 1, wherein the second level edge filters are configured for discarding an edge from the corresponding first level edge filters, upon detecting an edge corresponding to a must transition within a next four samples from the edge.

12. The system as claimed in claim 1, wherein the system is compatible with 100BASTE-T1 Ethernet standard.

13. The system as claimed in claim 1, wherein the system is compatible with 1000BASE-T1 Ethernet standard.

14. The system as claimed in claim 1, wherein the sampling point filters are configured for eliminating erroneous sampling points occurring as a result of consecutive same symbols for a long time, wherein the filtering comprises the steps of:
    retaining a sampling point if the sampling point corresponds to a must transition;
    for any sampling point, if it does not correspond to a must transition and if there is a sampling point within next four samples, that sampling point is discarded, and the second sampling point is retained; and
    retaining all other sampling points.

15. A method for decoding PAM-3 signals communicating between a master device (D1) and a slave device (D2), the method comprising:
    separating the master and the slave signals communicating between the master device (D1) and the slave device (D2);
    amplifying the master and slave signals to a specific voltage range;
    converting analog master and slave signals to digital master and slave signals; and
    processing both the digital master and slave signals for extracting PAM-3 symbols, wherein processing comprises:
    sampling and de-serializing digital master and slave signals;
    employing DC correction to compensate for variations in signal levels of the de-serialized digital master and slave signals;
    detecting PAM-3 levels from the de-serialized digital master and slave signals;
    filtering out spikes in the PAM-3 levels to generate initial PAM-3 levels;

generating PAM-3 symbols from the initial PAM-3 levels using a sampling point, wherein the sampling point calculation comprises the steps of:
- detecting all transitions and 'must transitions' which corresponds to positive to negative (+ve to −ve) or negative to positive (−ve to +ve) transitions within twelve samples, and registering the 'must transitions' of the filtered PAM-3 levels;
- detecting mid-point of each of the 'must transition';
- first and second level filtering to filter out erroneous transitions in the levels;
- calculating sampling point of each registered transitions; and
- filtering the sampling points for eliminating erroneous sampling points, if any.

16. The method as claimed in claim 15, wherein the calculation of sampling point comprises, selecting midpoint as the sampling point, for any second level filtered edge, if there is a non-zero midpoint value corresponding to the 'must transition'.

17. The method as claimed in claim 15, wherein the calculation of sampling point comprises, selecting twelfth sample from previous sampling point as the sampling point, for any second level filtered edge, if there is no non-zero midpoint value corresponding to a 'must transition'.

18. The method as claimed in claim 15, wherein the calculation of sampling point comprises, selecting every twelfth sample as the sampling point, if there is no second level filtered edge.

19. The method as claimed in claim 15, wherein filtering the sampling points comprises the steps of:
- retaining a sampling point if the sampling point corresponds to the must transition;
- for any sampling point, if it does not correspond to the must transition and if there is a second sampling point within next four samples from the sampling point, the sampling point is discarded, and the second sampling point is retained; and
- retaining all other sampling points.

* * * * *